US009087067B2

(12) United States Patent
Chirlian et al.

(10) Patent No.: US 9,087,067 B2
(45) Date of Patent: Jul. 21, 2015

(54) SYSTEM, METHOD, AND COMPUTER PROGRAM PRODUCT FOR MODELING CHANGES TO LARGE SCALE DATASETS

(71) Applicant: Armanta, Inc., Morristown, NJ (US)

(72) Inventors: Peter J. Chirlian, Basking Ridge, NJ (US); Boi Gu, Hillsborough, NJ (US); Eric J. Kaplan, Allendale, NJ (US); Aleksandr Shukhat, Milburn, NJ (US)

(73) Assignee: ARMANTA, INC., Morristown, NJ (US)

( * ) Notice: Subject to any disclaimer, the term of this patent is extended or adjusted under 35 U.S.C. 154(b) by 0 days.

(21) Appl. No.: 13/970,336

(22) Filed: Aug. 19, 2013

(65) Prior Publication Data

US 2013/0339394 A1 Dec. 19, 2013

Related U.S. Application Data

(63) Continuation of application No. 13/567,825, filed on Aug. 6, 2012, now Pat. No. 8,516,003, which is a continuation of application No. 12/130,925, filed on May 30, 2008, now Pat. No. 8,239,416.

(51) Int. Cl.
*G06F 7/00* (2006.01)
*G06F 17/30* (2006.01)

(52) U.S. Cl.
CPC ...... *G06F 17/30132* (2013.01); *G06F 17/3048* (2013.01); *G06F 17/30424* (2013.01); *G06F 2216/03* (2013.01)

(58) Field of Classification Search
CPC .............. G06F 17/30132; G06F 21/10; G06F 17/30902
USPC .............................. 707/796, 999.2; 705/36 R
See application file for complete search history.

(56) References Cited

U.S. PATENT DOCUMENTS

| | | | | |
|---|---|---|---|---|
| 4,989,141 A * | 1/1991 | Lyons et al. | | 705/36 R |
| 5,220,500 A * | 6/1993 | Baird et al. | | 705/36 R |
| 5,249,286 A | 9/1993 | Alpert et al. | | |
| 5,611,070 A | 3/1997 | Heidelberger et al. | | |
| 5,918,217 A * | 6/1999 | Maggioncalda et al. | ... | 705/36 R |
| 6,009,510 A | 12/1999 | Henry et al. | | |
| 6,012,042 A | 1/2000 | Black et al. | | |
| 6,029,148 A | 2/2000 | Zurstrassen | | |
| 6,091,412 A * | 7/2000 | Simonoff et al. | | 715/749 |
| 6,105,033 A | 8/2000 | Levine | | |
| 6,260,114 B1 | 7/2001 | Schug | | |
| 6,492,995 B1 * | 12/2002 | Atkin et al. | | 715/703 |
| 6,493,699 B2 * | 12/2002 | Colby et al. | | 707/999.002 |

(Continued)

*Primary Examiner* — Pavan Mamillapalli
(74) *Attorney, Agent, or Firm* — Sterne, Kessler, Goldstein & Fox P.L.L.C.

(57) ABSTRACT

Users can model changes to entities in large scale sets of data for various portfolio holdings in different respective sandbox caches. A method includes loading sets of data in a database and organizing the loaded data in entity caches according to an entity model, each entity cache corresponding to one or more entities associated with respective portfolio holdings. Further steps include creating an initial report of information drawn from the loaded data for manipulation by a user through a user-interface, storing information in the initial report in a respective sandbox cache having data organized according to the entity model, and enabling the user to manipulate the respective sandbox cache to change values in the data organized according to the entity model in the respective sandbox cache without changing values of data in other sandbox caches or in the database.

21 Claims, 16 Drawing Sheets

(56) References Cited

U.S. PATENT DOCUMENTS

| | | |
|---|---|---|
| 6,601,044 B1 * | 7/2003 | Wallman .................. 705/36 R |
| 6,725,337 B1 | 4/2004 | Tan et al. |
| 6,842,777 B1 * | 1/2005 | Tuli .............................. 709/217 |
| 6,842,897 B1 * | 1/2005 | Beadle et al. ..................... 718/1 |
| 6,898,608 B2 * | 5/2005 | Hopeman et al. ...... 707/999.104 |
| 7,464,069 B2 | 12/2008 | Chen et al. |
| 7,480,593 B2 * | 1/2009 | Gopalan ........................ 702/183 |
| 7,624,126 B2 | 11/2009 | Pizzo et al. |
| 7,647,356 B2 * | 1/2010 | Gupta ........................ 707/999.2 |
| 7,836,100 B2 | 11/2010 | Short et al. |
| 2003/0149571 A1 * | 8/2003 | Francesco et al. ................. 705/1 |
| 2003/0182307 A1 | 9/2003 | Chen et al. |
| 2003/0204534 A1 * | 10/2003 | Hopeman et al. ............. 707/200 |
| 2004/0267824 A1 | 12/2004 | Pizzo et al. |
| 2005/0262108 A1 * | 11/2005 | Gupta .......................... 707/100 |
| 2006/0271510 A1 | 11/2006 | Harward et al. |
| 2006/0271511 A1 | 11/2006 | Harward et al. |
| 2006/0271557 A1 | 11/2006 | Harward et al. |

* cited by examiner

SYSTEM, METHOD, AND COMPUTER PROGRAM PRODUCT FOR MODELING CHANGES TO LARGE SCALE DATASETS

This application claims the benefit of and is a continuation of application Ser. No. 13/567,825 (pending), filed on Aug. 6, 2012, which is continuation of application Ser. No. 12/130,925, filed on May 30, 2008, now U.S. Pat. No. 8,239,416 (each of which is incorporated in its entirety herein by reference).

BACKGROUND OF THE INVENTION

1. Field of the Invention

The technology described herein relates to processing information from a database, and more particularly relates to using such information to perform modeling.

2. Background Art

It is a common need among analysts, whether financial or technological, to create models based on data that may reside in a database. A financial analyst, for example, may rely on a database that contains information corresponding to one or more portfolios, each of which has some number of holdings. Each holding in turn may have some name, a related price per share, and an indication of the number of shares held. The analyst may then desire to take this information, and create one or more hypothetical portfolios. The analyst can then analyze the information, and manipulate it to vary holdings, amounts held, or prices. The analyst may then be able to project future performance, for example, or otherwise track changes to the model, based on particular performance parameters.

It may be undesirable, however, to make reflect such changes in the underlying database. The data therein may be needed by other analysts, or may otherwise be needed for future reference. Moreover, the information in the database may represent historical data that needs to be preserved. In addition, it would be undesirable to allow the manipulations performed on a given model to impact other models that may have been created by other analysts using the same database. Yet, it may also be desirable to share a given model with other analysts.

There are no available solutions that can deal with these problems, in a practical way. A simple spreadsheet may be used, for example. But if the amount of data is significant, scalability issues arise in light of the amount of memory and processing capability that would be needed. A given index fund, for example, may have thousands of records. This is compounded by the fact that there may be a need to model tens of thousands of portfolios.

While such a solution could be implemented using memory media, such as random access memory, it should also be kept in mind that most of the values that would be imported from a database will likely remain unchanged throughout the modeling process. This would represent a significant waste of memory for information that is never manipulated. Given the large amount of memory that may be required, and the possible need for multiple competing platforms on which to perform the modeling, such a solution is not realistic.

What is needed, therefore, is a solution that is scalable, not memory intensive, and does not impact the underlying database or modeling performed by other analysts.

BRIEF DESCRIPTION OF THE DRAWINGS/FIGURES

Figure 1:
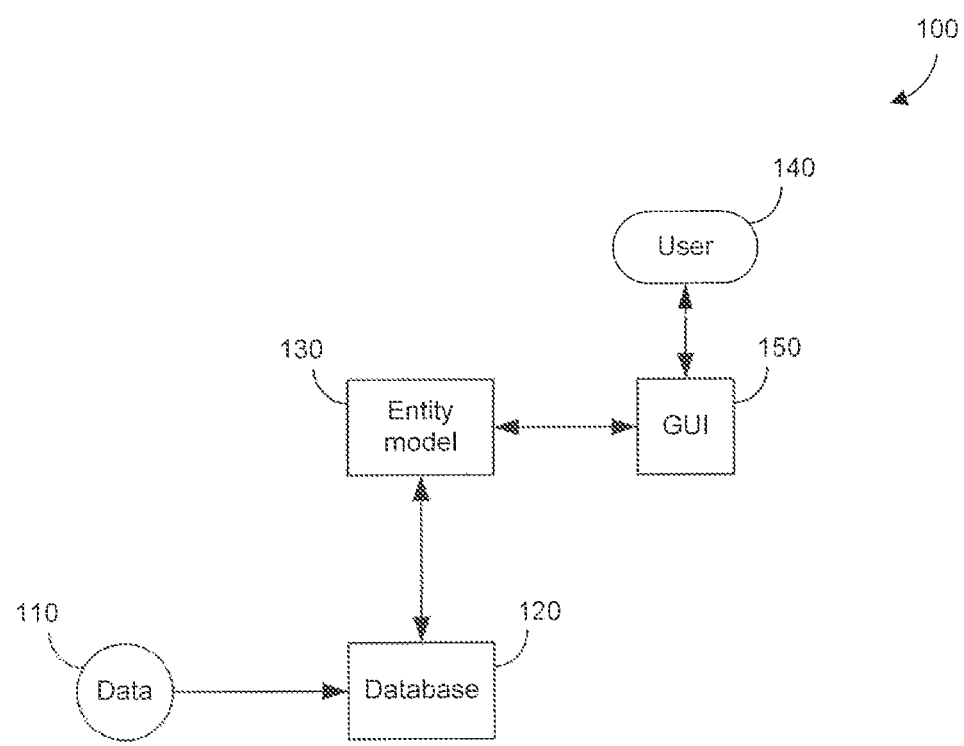
FIG. 1 illustrates the relationship between a database, a related entity model, and a user, according to an embodiment of the invention.

Further embodiments, features, and advantages of the present invention, as well as the operation of the various embodiments of the present invention, are described below with reference to the accompanying drawings.

DETAILED DESCRIPTION OF THE INVENTION

A preferred embodiment of the present invention is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

I. OVERVIEW

The invention described herein includes a system, method, and computer program product for addressing the above needs. From the user perspective, the user or analyst appears to have a body of information in a data structure that can be manipulated independently of an underlying database. In an embodiment of the invention, the data structure is an entity cache. The entity cache manipulated directly by a user is referred to herein as a user entity cache or a sandbox cache. The sandbox metaphor alludes to the fact that the analyst can manipulate information within his user entity cache (or "sandbox"), without necessarily impacting the caches ("sandboxes") of other analysts, or impacting the underlying database. An entity within the user entity cache is referred to herein as a user entity or a sandbox entity.

Working through the sandbox cache, the user can access the underlying database. Global data can flow into the sandbox cache, if such data does not represent a conflict with any other user-defined data in the sandbox cache. In particular, in an embodiment of the invention, data in the database is organized as an underlying cache. This underlying cache, referred to herein as a real cache, or an underlying entity cache, provides the information that is used by the sandbox cache, while not being copied per se by the sandbox cache. The sandbox cache, in other words, does not represent a copy of the underlying entity cache. Rather, the sandbox cache stores information that has either been changed, added, or removed, relative to the underlying entity cache. The underlying entity cache, in contrast, contains all values, both static and computed (described in greater detail below), as well as status information.

The user can then manipulate information in the sandbox cache. For example, entities, e.g., holdings, can be added or deleted. Particular values may be changed or calculated, or recalculated. Not every value can be manipulated, however. As will be described in greater detail below, it can be useful for the system implementing the invention, to track what values can or can not be overwritten. Of the values that can be overwritten, it can also be useful to track which values have already been overwritten. Moreover, this status information may be specific to a particular sandbox cache. A given value will be given the status of "insensitive" if the value can not be overwritten. A value will be given the status of "global" with respect to one or more specific sandbox caches, if that value has not been changed in those specified sandbox aches. A value is given the status of "particular" for a specific sandbox cache if the value has been changed in that specific sandbox cache.

Note that some values will necessarily be dependent on other values. For example, the market value of a particular holding will be dependent on the number of shares owned in that particular holding, as well as the price per share of that holding. Changes made to a particular value will be reflected in all values that depend on the changed value. Also, as stated above, despite changes made in, a sandbox cache, the underlying database remains unchanged unless the user chooses otherwise. Similarly, the sandbox caches not involved in a particular manipulation will also remain unchanged.

II. STRUCTURAL DESCRIPTION

An embodiment of the invention can be implemented with respect to data that is organized according to an entity model. An entity model can be viewed as a high level, coarse grained inventory of entities and their relationships. One or more entities can be organized as a cache of information. Entities in different caches can be related to one another through primary and foreign keys. The system of primary and foreign keys may be similar to that typically used in a relational database.

FIG. 1 illustrates the relationship between data, a database, and an entity model, according to an embodiment of the invention. Data 110 is initially loaded into a database 120 in a process that is generally independent of the present invention. The data 110 in database 120 is modeled according to an entity model 130. The concept of an entity model is described in greater detail below. A user 140 can then access the data as it is structured in entity model 130. Access can be facilitated by a graphical user interface (GUI) 150 in an embodiment of the invention.

Figure 2:
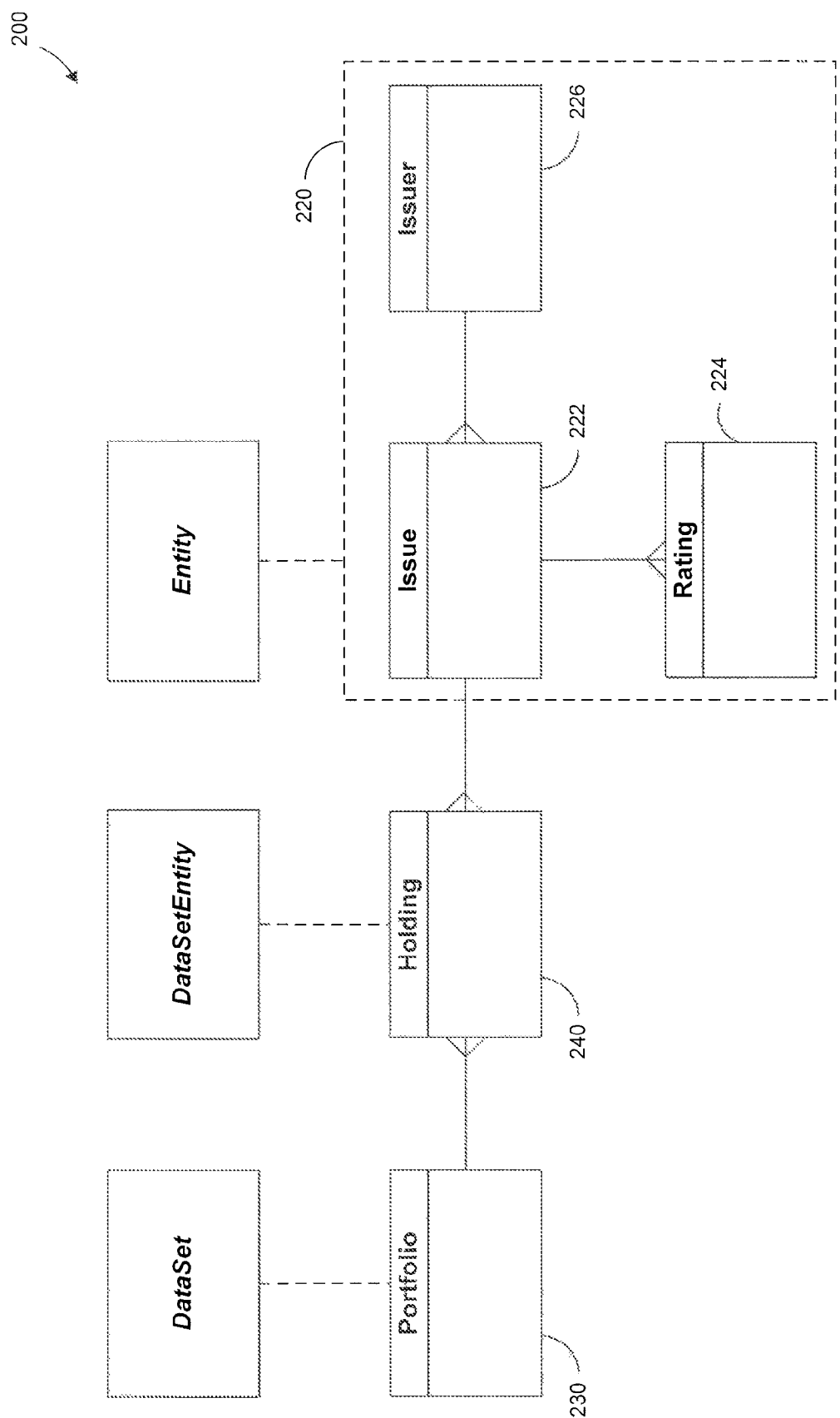
FIG. 2 illustrates how an entity model can be used to support the processing of the invention, according to an embodiment thereof.

FIG. 2 illustrates a particular example of how an entity model can be used to represent financial portfolios, according to an embodiment of the invention. A dataset can correspond to a portfolio, such as portfolio 230. The portfolio 230 includes one or more holdings 240. Data related to holding 240 is contained across the entities 220. Specific information within entity 220 may include, for example, the identity of the issue 222, the rating 224 of the issue 222, and the related issuer 226.

Figure 3:
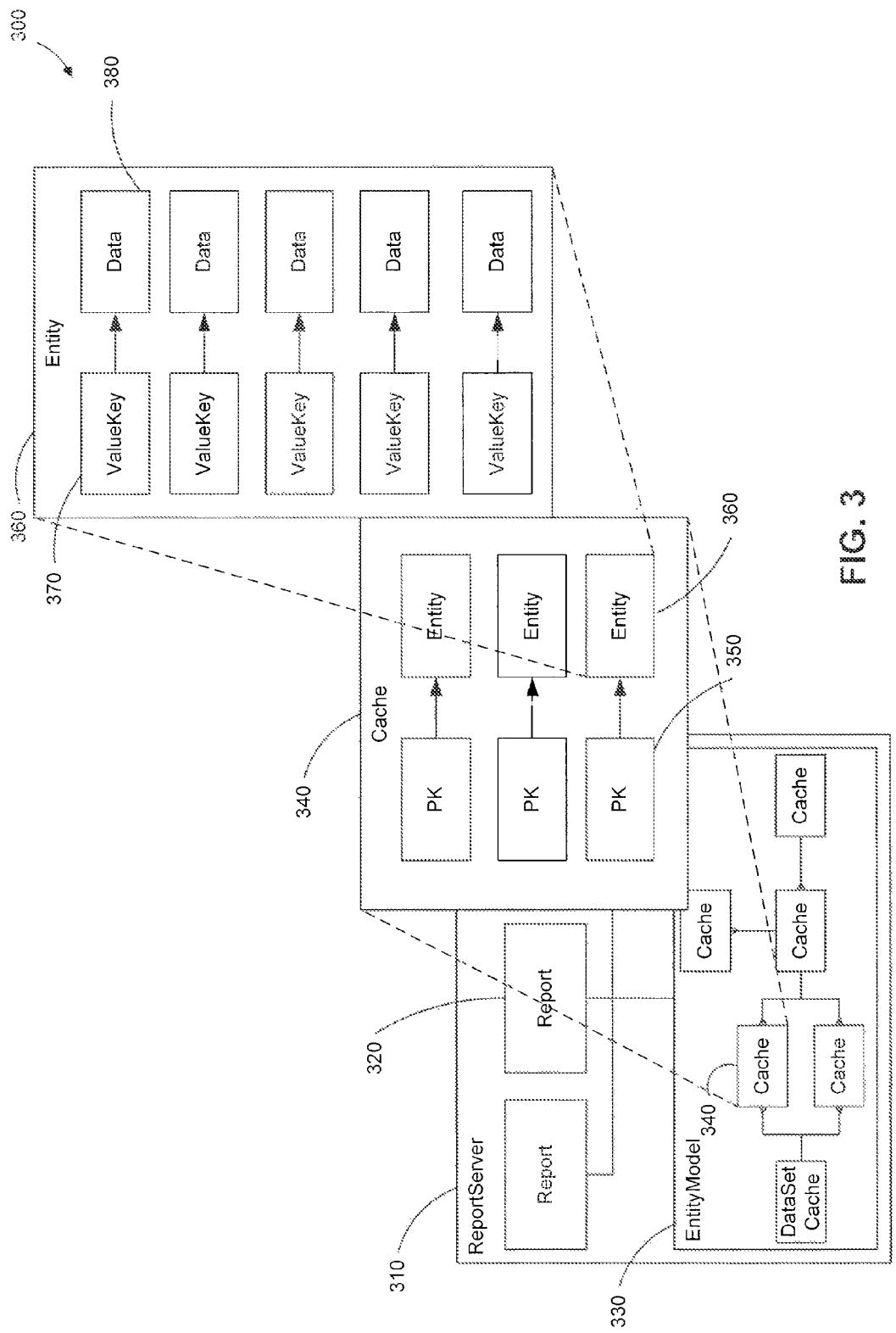
FIG. 3 illustrates the hierarchical structure of an entity model, according to an embodiment of the invention.

A given entity model may include a plurality of caches, each of which may include a plurality of entities. Any given entity may include a plurality of data items. This is illustrated in FIG. 3. This is an exploded view of an entity model 330, which may be part of a larger report server object 310. As will be described below, entity model 330 includes the information required to populate a report 320.

Entity model 330 includes one or more caches, such as cache 340. As noted above, a cache may correspond to a portfolio. Cache 340 includes one or more entities, such as entity 360. Each entity is identified by a primary key (PK). The primary key for entity 360 is key 350. If cache 340 represents portfolio holdings, then entity 360 may represent a particular holding in the portfolio.

Entity 360 may include one or more data items 380. A given data item 380 is associated in this illustration with a value key 370. A particular data item may be, for example, a market value, a number of shares, or a rating for the holding.

Figure 4:
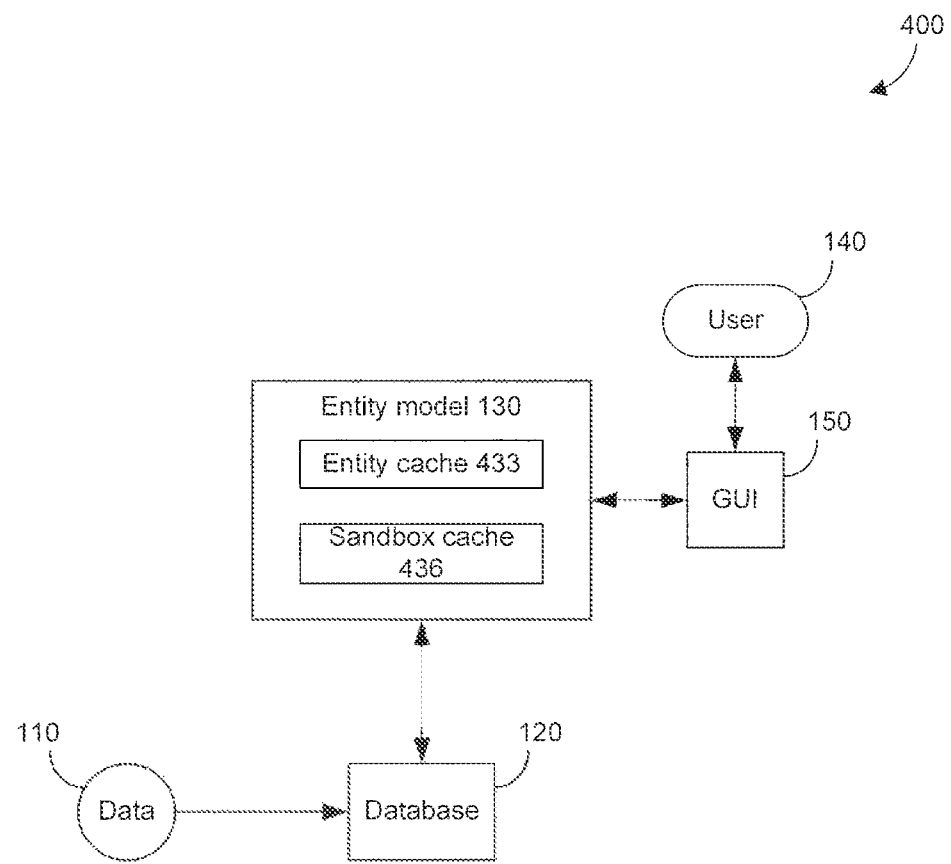
FIG. 4 illustrates the use of a sandbox cache and a related entity cache in an entity model, according to an embodiment of the invention.

Note that the organization of information in an entity model (as shown in FIG. 4, for example) permits manipulation of the information in the manner described in the following sections. Alternate embodiments of the invention, however, may not necessarily require an entity model.

FIG. 4 is similar to FIG. 1, but shows the entity model 130 in greater detail. Entity model 130 includes two caches. The first is shown as entity cache 433. This cache represents information from database 120, structured according to an entity model format. Entity model 130 also includes sandbox cache 436. This represents the cache manipulated directly by the user 140. The sandbox cache 436 is derived from, but does not necessarily copy, underlying entity cache 433. The latter cache is a representation of database 120, while sandbox cache 436 represents manipulations thereof.

III. PROCESSING

Figure 5:
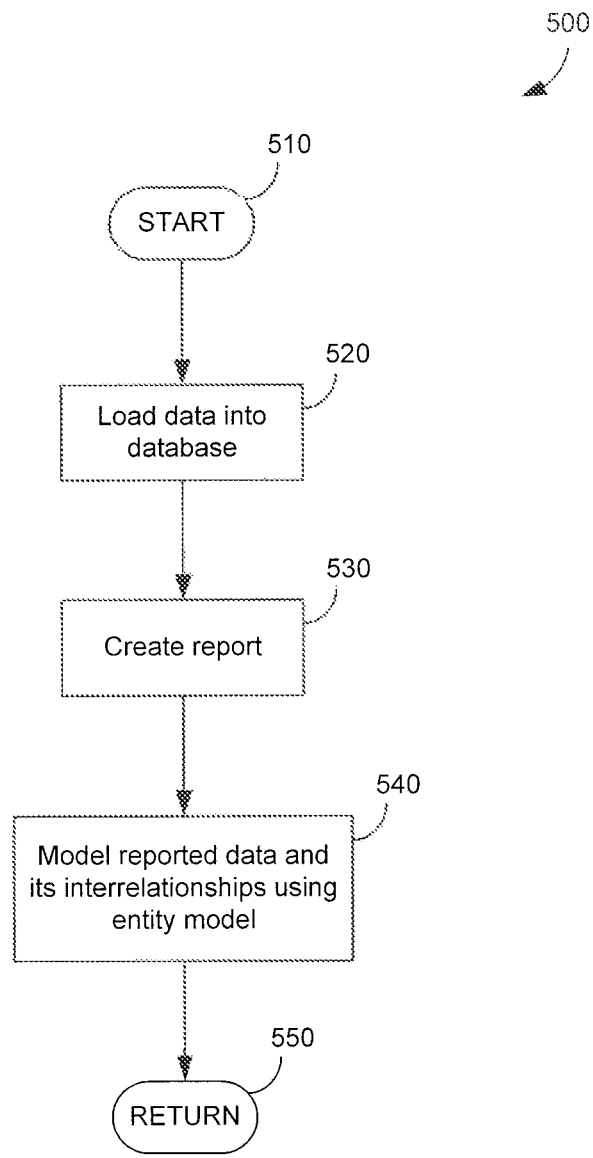
FIG. 5 illustrates the process of creating a sandbox cache, according to an embodiment of the invention.

The processing of the invention begins with the creation of a sandbox cache. This process is illustrated in FIG. 5. The process begins at step 510. In step 520, an underlying database is loaded with data that may be organized ultimately as one or more entity caches. In step 530, a report is created. The report is typically opened by a user. The information in the report can then be used in a new or existing sandbox cache. This is shown as step 540, where the information from the report and interrelationships between the data are modeled in the entity model format. The process concludes at step 550.

Figure 6A:
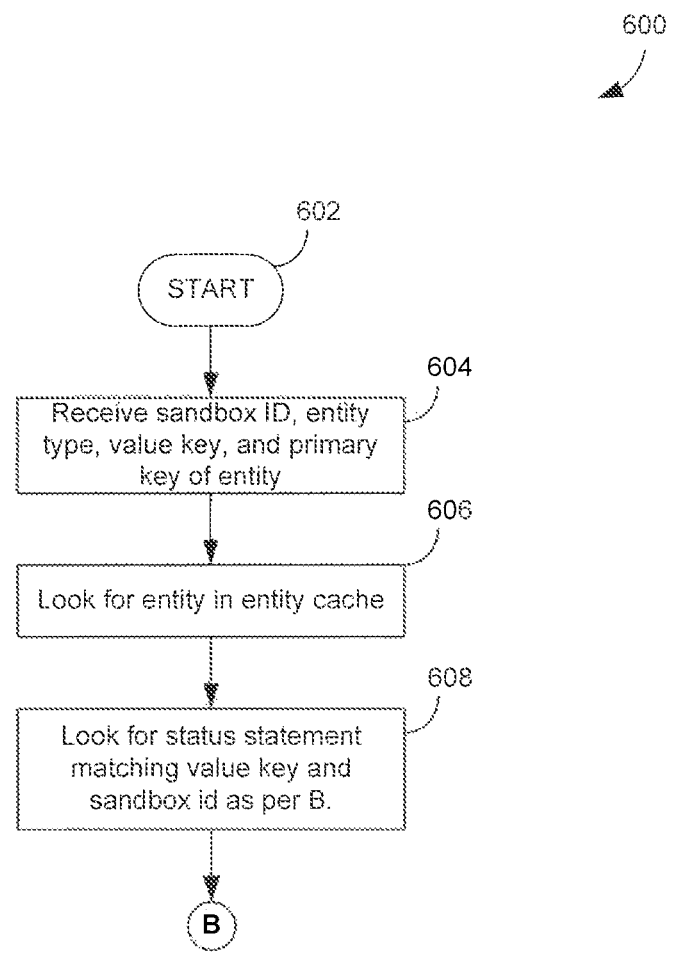
FIGS. 6A-6C illustrate the process of retrieving a static value, according to an embodiment of the invention.
Figure 6B:
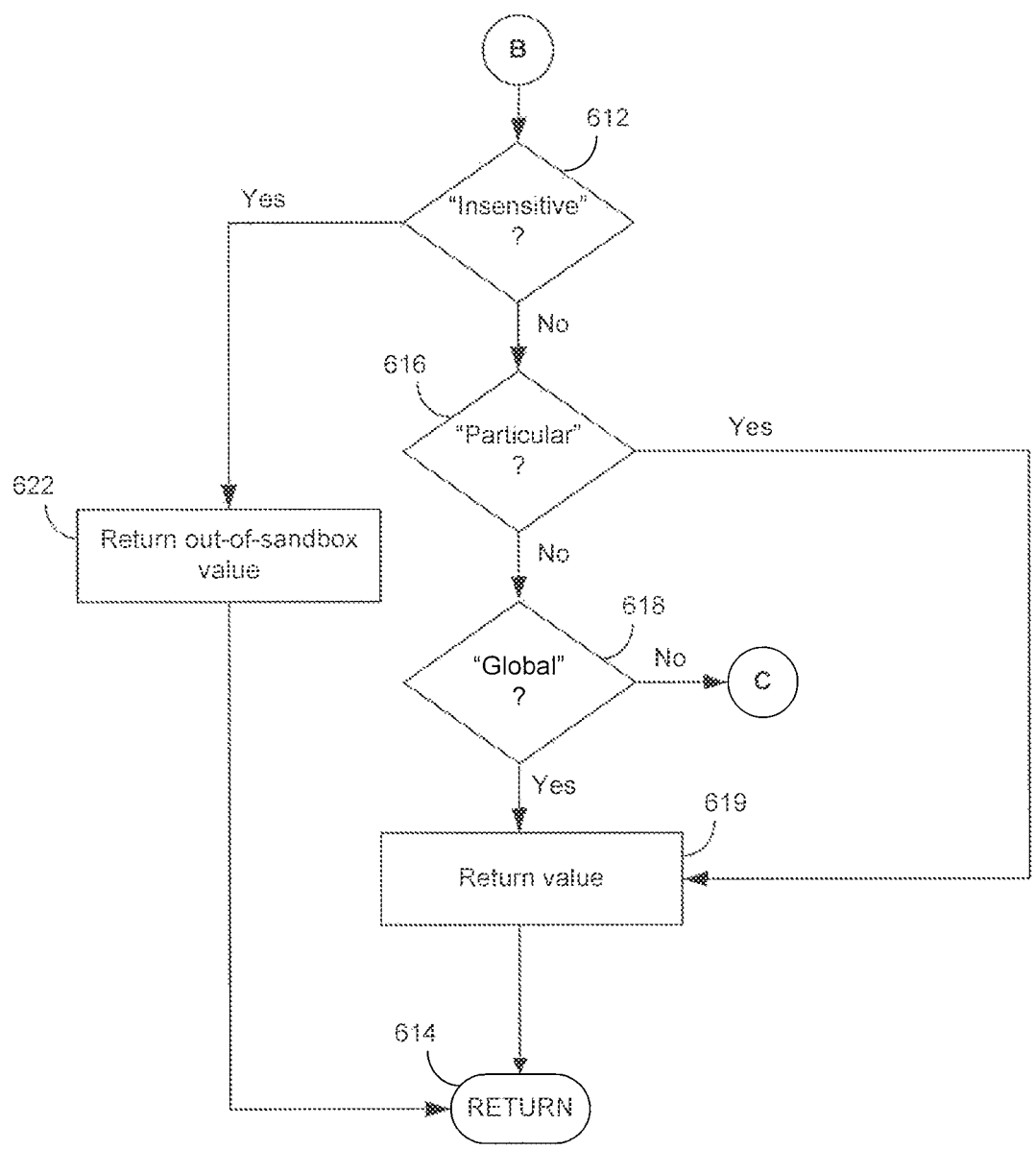
Figure 6C:
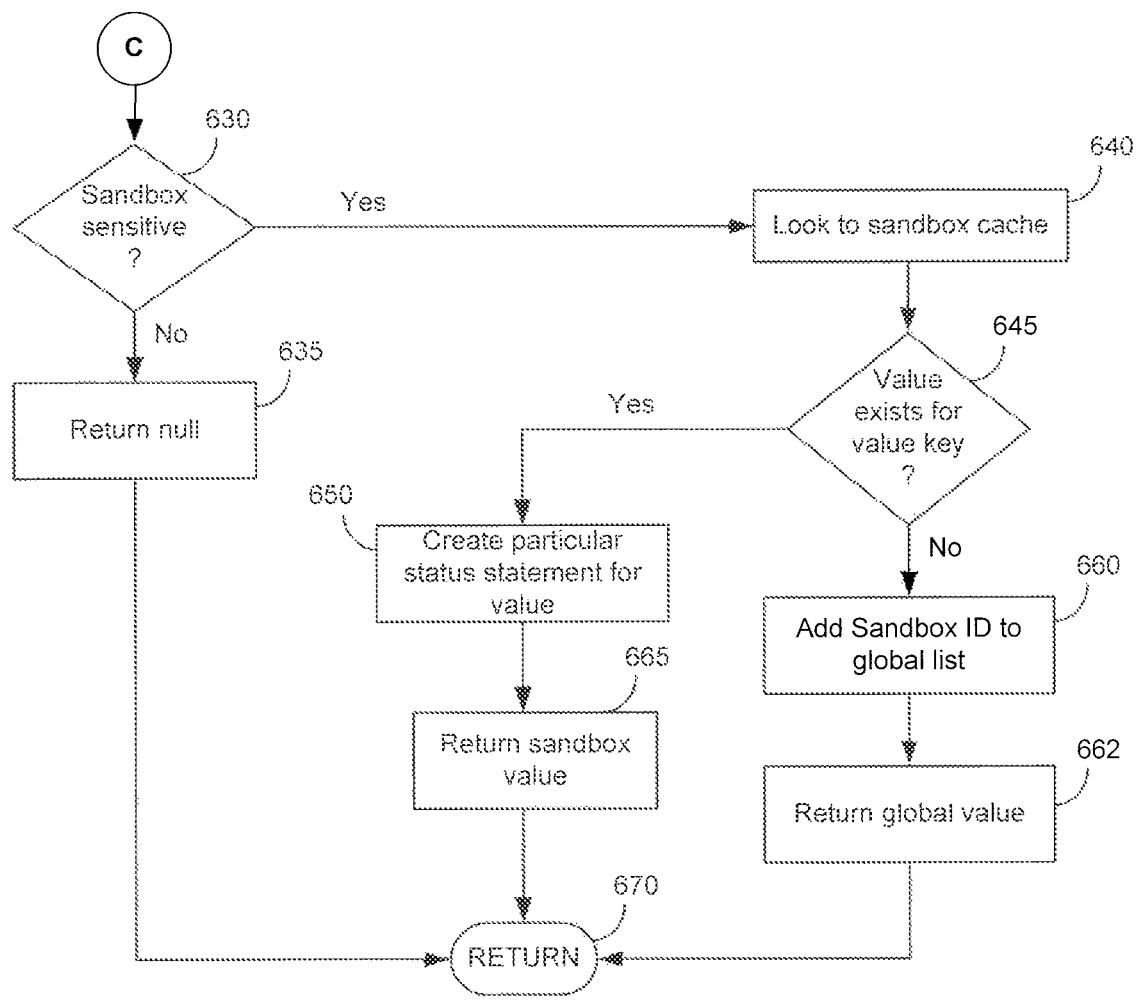

The user is free to manipulate the sandbox cache in any one of a number of ways. The user may, for example, wish to change one of the static values in the sandbox cache. Here, the term static value refers to a value in the sandbox cache that can be edited. This is to be contrasted with calculated values, which represent values that are functions, or are otherwise derived from, other values. The process of retrieving a static value is illustrated in FIGS. 6A-6C, according to an embodiment of the invention. The process begins with step 602. In step 604, a specific value is first identified. This is done by supplying four identifiers that, in aggregate, represent a unique identifier for a specific static value. In an embodiment of the invention, these are the entity type, the identifier for the sandbox cache a primary key for the entity, and a value key. Note that in an embodiment of the invention, the sandbox cache identifier, or sandbox ID, may be a path name if the data is organized in a hierarchical manner. These four items of information are received in step 604. In step 606, the corresponding entity in the underlying entity cache is looked up. In step 608, an appropriate status statement that matches (1) the value key of the identified value, and (2) the sandbox ID, is sought. The concept of status statements is described below. There may be multiple status statements within an entity for a given value key.

As mentioned above, a specific value in a given sandbox cache will have one of three possible statuses. First, the value may be "insensitive." In this case, the value is some constant that is not to be changed. One, example of this is the name of a holding. If an entity represents some number of shares of IBM stock, the value "IBM" will be it the entity cache but cannot be changed. Second, a value may be "global" with respect to one or more sandbox caches. In this case, the value has not been overwritten in those sandbox caches. This is not to suggest that such a value cannot be overwritten in the future. Rather, such a designation indicates that, at present, this value has not been overwritten in the indicated sandbox caches. Third, value may have a status designated as "particular." This status indicates that the value has been overwritten in an indicated sandbox cache.

The latter two statuses can be illustrated with the following example. Assume three sandbox caches, having sandbox IDs A, B, and C. We represent a value corresponding to an amount by the identifier AMT. If the amount is unchanged in sandbox caches B and C, this is indicated by the status statement $$AMT \rightarrow global[B, C].$$

If value AMT has been changed in sandbox cache A, then this status is indicated by the statement $$AMT \rightarrow particular[A].$$

If the value AMT were to be changed in sandbox cache B, then the result would be a status statement $$AMT \rightarrow particular[B].$$

Moreover, the global statement would be changed so that it would now read $$AMT \rightarrow global[C].$$

This latter statement indicates that the value AMT is now global only with respect to sandbox cache C.

Moving on to FIG. 6B, in step 612, a determination is made as to whether the status statement shows that the value is insensitive. If so, the value can not be overwritten in a sandbox and an out-of-sandbox value (i.e., a value from the underlying entity cache) is returned at step 622. Otherwise, the process proceeds to step 616. Here, a determination is made as to whether the value, with respect to the indicated sandbox cache, has the status "particular." If so, the value corresponding to this status statement is returned in step 622. It in step 616, the value is not found to have a "particular" status with respect to the indicated sandbox cache, then the process continues at step 618. Given that the status is neither "insensitive" nor "particular," then a "global" status statement for the value and the indicated sandbox cache ID is sought. If a "global" statement containing this sandbox is found, then the associated value is returned, otherwise we continue to FIG. 6C, step 630.

If, in step 618, no global statement is found, then the process continues to step 630. In an embodiment of the invention, sandbox sensitivity can be determined using information supplied by a user, such as a resource file that indicates the sensitivity of a value. If the value is not found to be sandbox sensitive in step 630 (i.e., is insensitive), then at step 635, a null value is returned and in step 670, the process concludes.

If, however, in step 630, the value is found to be sandbox sensitive, then the process continues at step 640. Here the process looks to the sandbox cache. In step 645, a determination is made as to whether the specified value exists for the given value key. If so, then in step 650, the particular status statement is created for the value and the sandbox value is returned. Otherwise, in step 660, the sandbox cache ID is added to the global statement for that value and the global value is returned in step 662.

A calculated value can also be retrieved where such a value is function of other values. An example of such a value is market value for a holding. The market value for a holding is generally calculated as the product of the number of shares of the holding and the price per share of the holding. In an embodiment of the invention, a value can have associated metadata, including the name of a class of operations that computes the value. The calculation is not performed unless the value is being accessed. The logic that performs the calculation can be viewed as a function or a "computer". The process for retrieving a calculated value is similar to the process for retrieving a static value (see FIGS. 6A-6B), except that the calculation has to be performed before it can be determined whether the value is sandbox sensitive.

Figure 7:
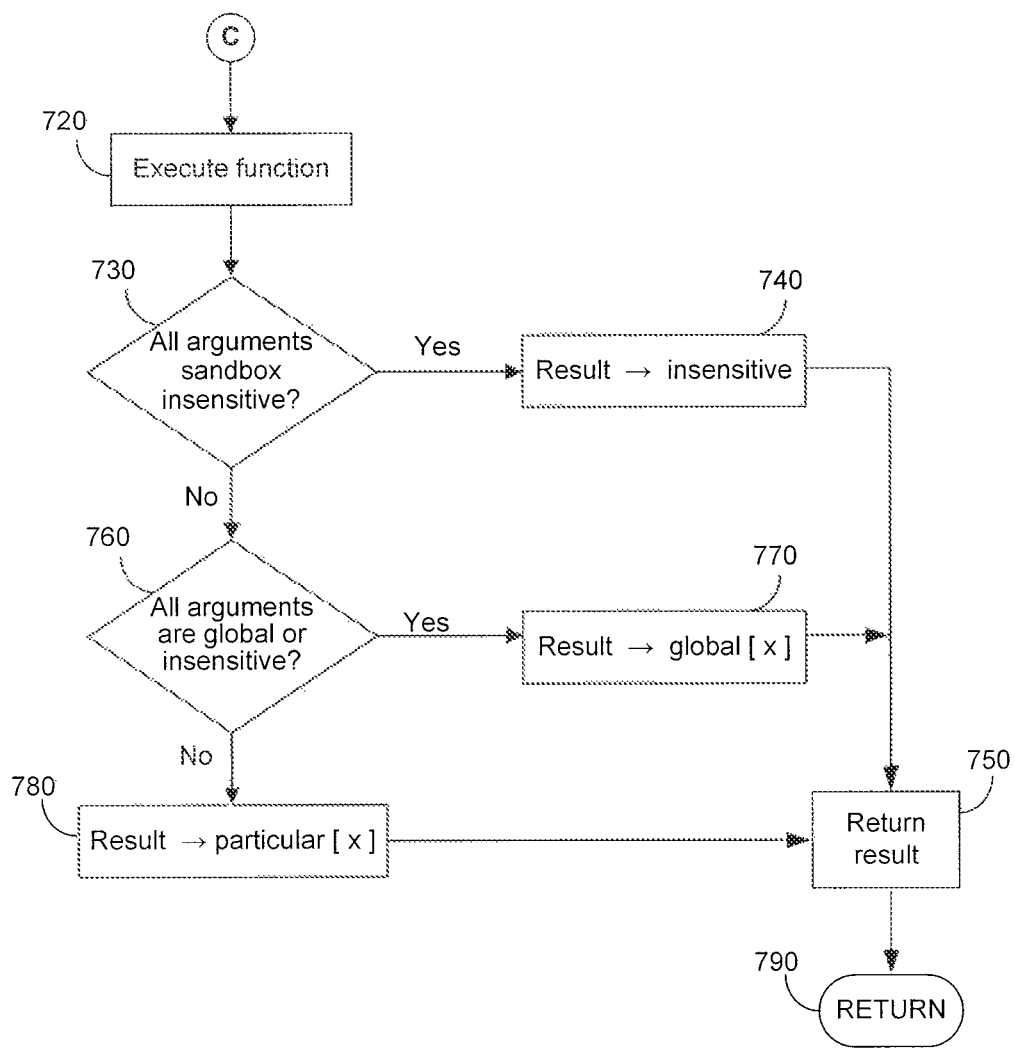
FIG. 7 illustrates the process of determining whether a calculated value is sandbox sensitive, according to an embodiment of the invention.

The difference is shown in FIG. 7, starting from point C. At step 720, a function (implementing calculation of the value) is executed. In executing the function, the arguments of the function can be examined to determine if all are sandbox insensitive, as illustrated in step 730. If so, the resulting value is, insensitive (step 740). The result is then returned in step 750. If not all arguments are sandbox insensitive, then the process continues at step 760. Here a determination is made as to whether all the arguments are global or insensitive. If so, then the resulting value is assigned the global status in step 770, and the result is returned in step 750. If, in step 760, it is determined that not all the arguments are global, then in step 780 the result is assigned the particular status, and the result is returned in step 750.

Figure 8:
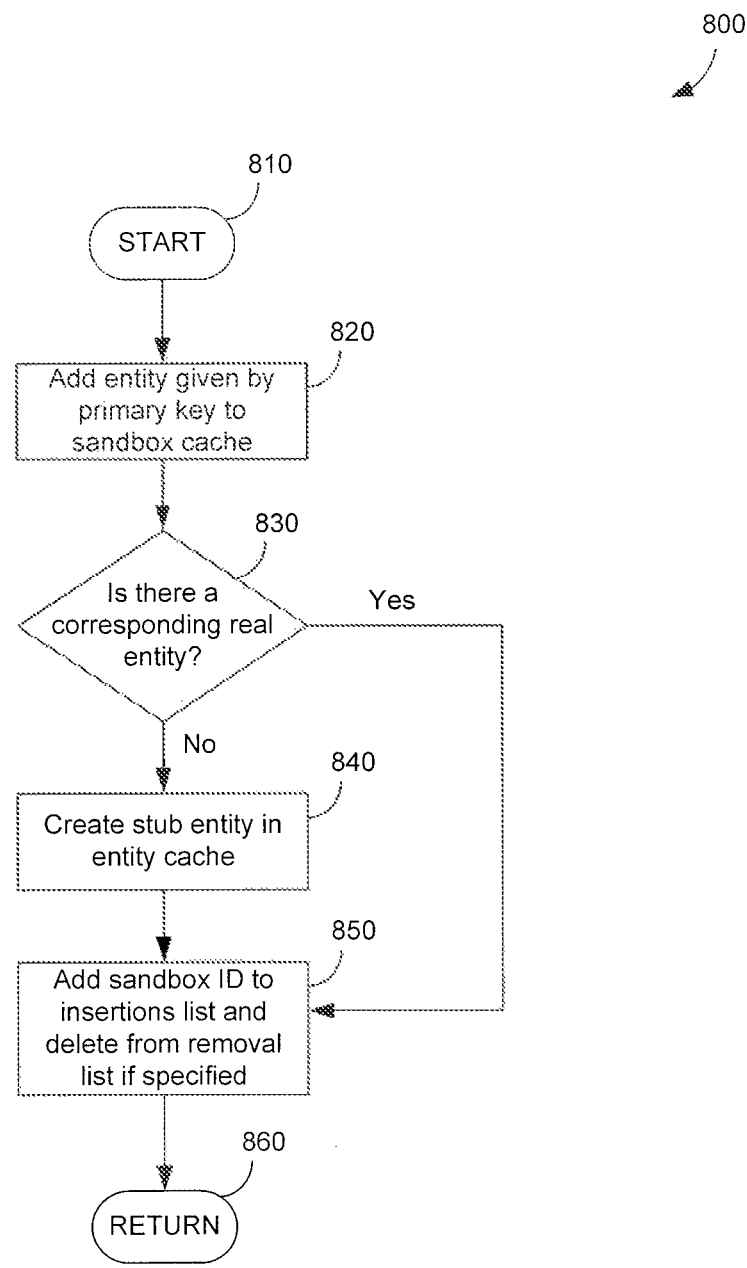
FIG. 8 illustrates the process of adding an entity to a sandbox cache, according to an embodiment of the invention.

An entity may also be removed from or inserted into a sandbox cache. To facilitate this, for any entity there can be three associated fields. The first is a variable value REAL. This variable indicates whether or not the entity exists outside of any sandbox. If for example, a corresponding entity exists in the corresponding underlying entity cache, then the value REAL is true. If not, the value of REAL is false. Second, a list is maintained indicating the sandbox caches into which the entity has been inserted. Third, a list is maintained indicating the sandbox caches from which the entity has been removed. With this in mind, the process of inserting an entity into a sandbox cache, according to an embodiment of the invention, is illustrated in FIG. 8. The process begins at step 810. In step 820, the entity corresponding to the primary key is added to the sandbox cache. In step 830, a determination is made as to whether there is a corresponding real entity. If so, the process continues at step 850. Here, the sandbox cache ID is added to the insertions list for the entity. The sandbox ID is deleted from the removals list if specified on that list. The process concludes at step 860. If, however, it is determined in step 830 that there is no corresponding real entity, then the process continues at step 840. Here, a stub entity is placed in the entity cache. In step 950, the sandbox cache ID is added to the insertions list for that entity and the sandbox ID is deleted from the removals list if specified on that list.

Figure 9:
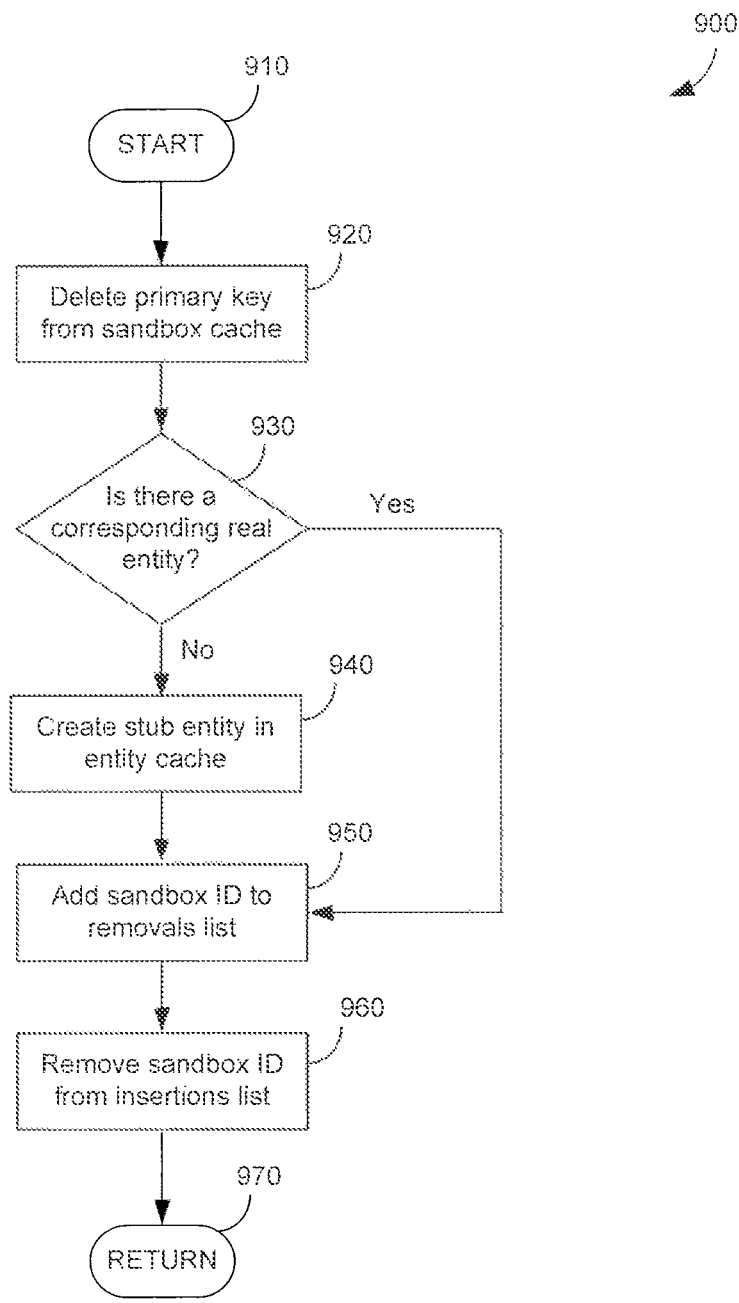
FIG. 9 illustrates the process of removing an unwanted entity from a sandbox cache, according to an embodiment of the invention.

The process of removing an unwanted user entity from a sandbox cache is illustrated in FIG. 9, according to an embodiment of the invention. The process begins at step 910.

In step 920, the primary key of the entity is deleted from the sandbox cache. In step 930, a determination is made as to whether there is a corresponding real entity. If so, the process continues at step 950, where the sandbox cache ID is added to the removals list of that entity. In step 960, the sandbox cache ID is removed from the insertions list for that entity of that entity. If, however, it, is determined in step 930 that there is no corresponding real entity, then the process continues at step 940. Here, a stub entity is created in the entity cache. In step 950, the sandbox cache ID is added to the removals list for the entity. In step 960, the sandbox cache ID is removed from the insertions list for this entity. In step 970, the process concludes.

Moreover, if an entity has been either updated or inserted, or removed from a sandbox cache, this change is immediately persisted to the underlying sandbox database. This is a separate database reserved for persisting changes to a sandbox.

Figure 10:
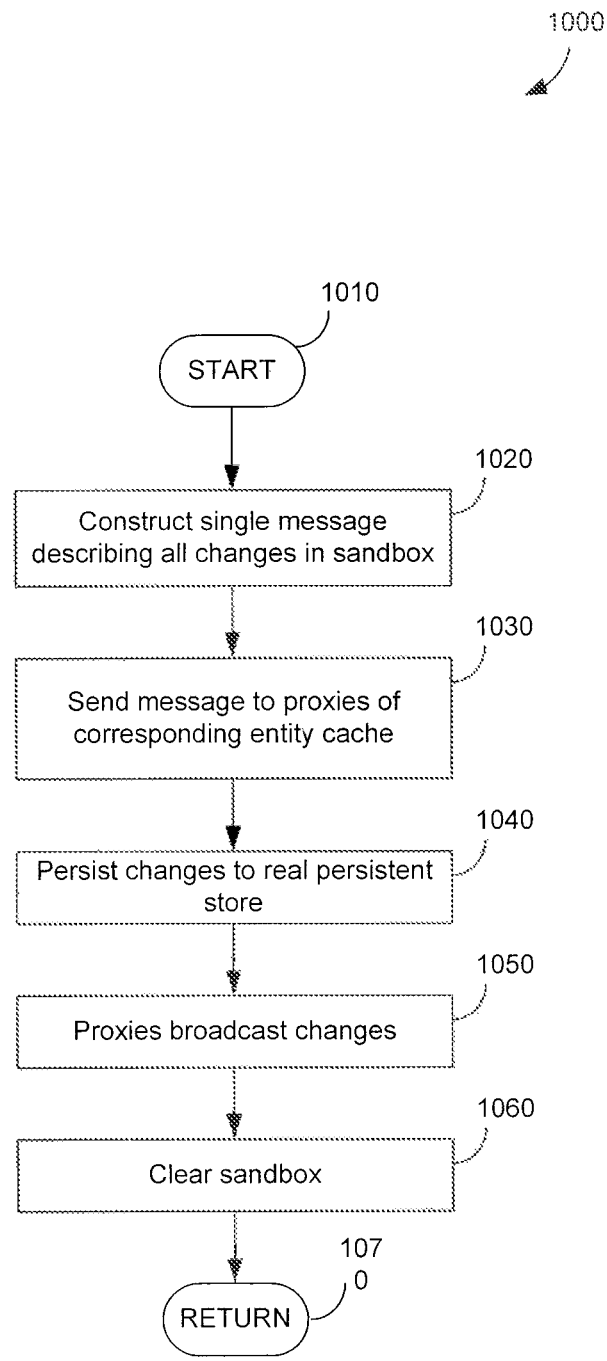
FIG. 10 illustrates the process of publishing a sandbox cache, according to an embodiment of the invention.

If the user so desires, the contents of a sandbox cache can be published. Publication refers to the process of making the contents of the sandbox cache available globally. In an embodiment of the invention, the publication process is facilitated by the use of proxy code that is associated with each value in an underlying entity cache. As will be described below, a proxy logic serves to persist a value to the underlying database, and broadcast any changes to the value globally. Such a publication process is illustrated in FIG. 10. The process begins at step 1010. In step 1020, a single message is constructed describing all changes that have been made to a sandbox cache. In step 1030, the message is sent to the proxies of the corresponding entity cache. In step 1040, changes to the sandbox cache are persisted to real storage. In step 1050, the proxies broadcast the changes globally. In step 1060, the sandbox can be cleared. The process concludes at step 1070.

Figure 11:
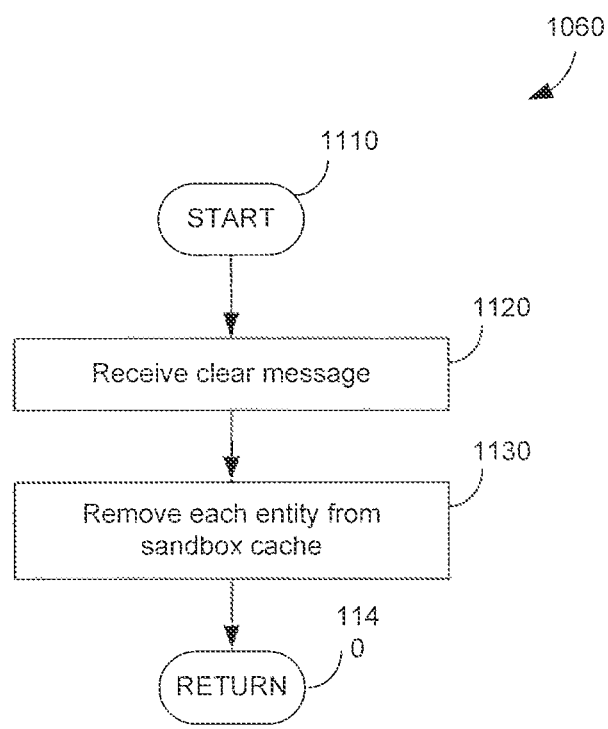
FIG. 11 illustrates the process of clearing a sandbox cache, according to an embodiment of the invention.

The clearing process of step 1060 is illustrated in greater detail in FIG. 11, according to an embodiment of the invention. Here the process begins at step 1110. In step 1120, a message to clear the sandbox cache is received. In step 1130, each entity is removed from the sandbox cache. The process concludes at step 1140.

Figure 12:
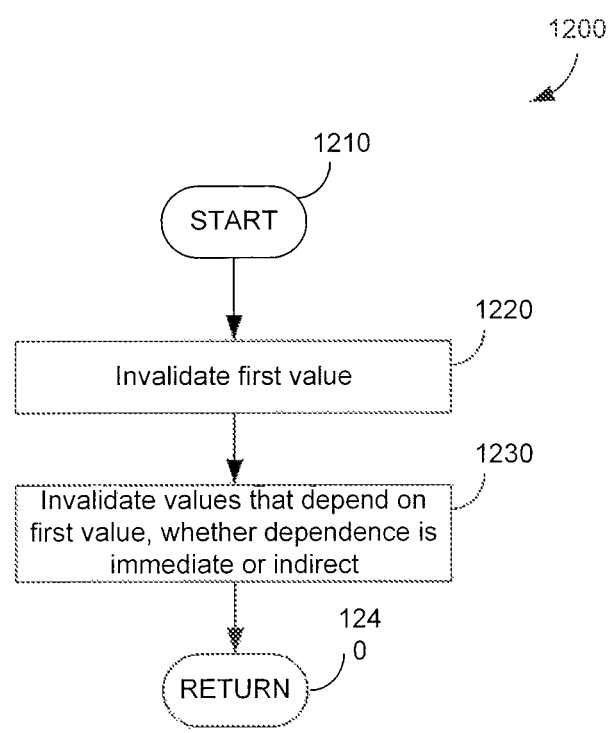
FIG. 12 illustrates the invalidation process, according to an embodiment of the invention.

As values and entities are changed, recalculated, added or deleted, the values dependent thereon are necessarily affected. To facilitate this process such that deleted or overwritten values are no longer available, an embodiment of the invention includes an invalidation process. This is illustrated in general terms in FIG. 12. The process begins at step 1210. In step 1220, a given first value is invalidated. This represents the value being overwritten or deleted. In step 1230, additional values may be invalidated as well. These are values that immediately depend on the first (now invalidated) value. If, for example, a first value is invalidated, all values that represent functions of this invalidated value must also be invalidated. Moreover, any value that depends indirectly on the first value is also invalidated. The process concludes at step 1240.

Figure 13:
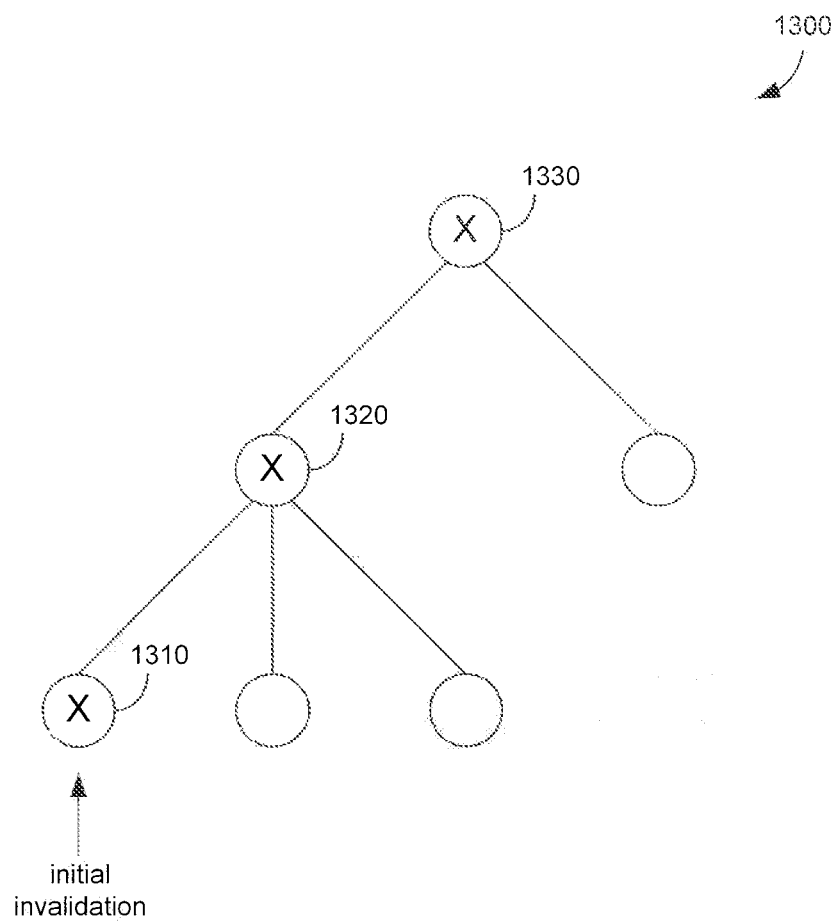
FIG. 13 illustrates the dependency between values, as accommodated by an embodiment of the invention.

This is illustrated in FIG. 13. Values here are shown as nodes of a directed graph. A node may have one or more child nodes. A parent node, or value, is a function of its subordinate values. Therefore, if a value is invalidated, value 1320 is necessarily invalidated because this latter value immediately depends on value 1310. Similarly, because value 1320 is now invalidated, value 1330 must be, invalidated because it depends on value 1320. Hence value 1330 is invalidated because it depends indirectly on invalidated value 1310. Note that invalidation of an insensitive or particular value represents deletion of the value. Invalidation can also be applied to a status statement. For example, invalidation of a global status statement for a given sandbox cache means only that this sandbox cache is removed from the global list.

Note that some functions may not be simple arithmetic operations. Some may depend on values such that a change in a subordinate value caused the operation of the function to be redefined. The redefinition may create new dependencies and eliminate others if the redefined function now depends on different values and is independent of others on which it had previously depended.

Invalidation is not limited to values in the traditional sense. A value may be a number, such as price per share. But in embodiments of the invention, filters that are used to direct access from one entity cache to another are also values. A filter may also be part of a chain of dependencies and are therefore subject to invalidation. A filter may be viewed as a special value in a sandbox cache, where the filter serves to indicate one or more values that match the criteria specified by the filter. Just like other values, a filter can be sandbox sensitive and have an associated status statement.

Referring back to FIGS. 6A-6C, when an entity in a real cache is requested for a sandbox value (see step 606) and the status message for this value is not found (see steps 612, 616, and 618), the value retrieval process in step 640 looks into the sandbox cache for the corresponding sandbox entity. The filter is used to find this sandbox entity. If the sandbox entity is found and contains an overwritten value for the given value key, this value is returned (step 665).

Figure 14:
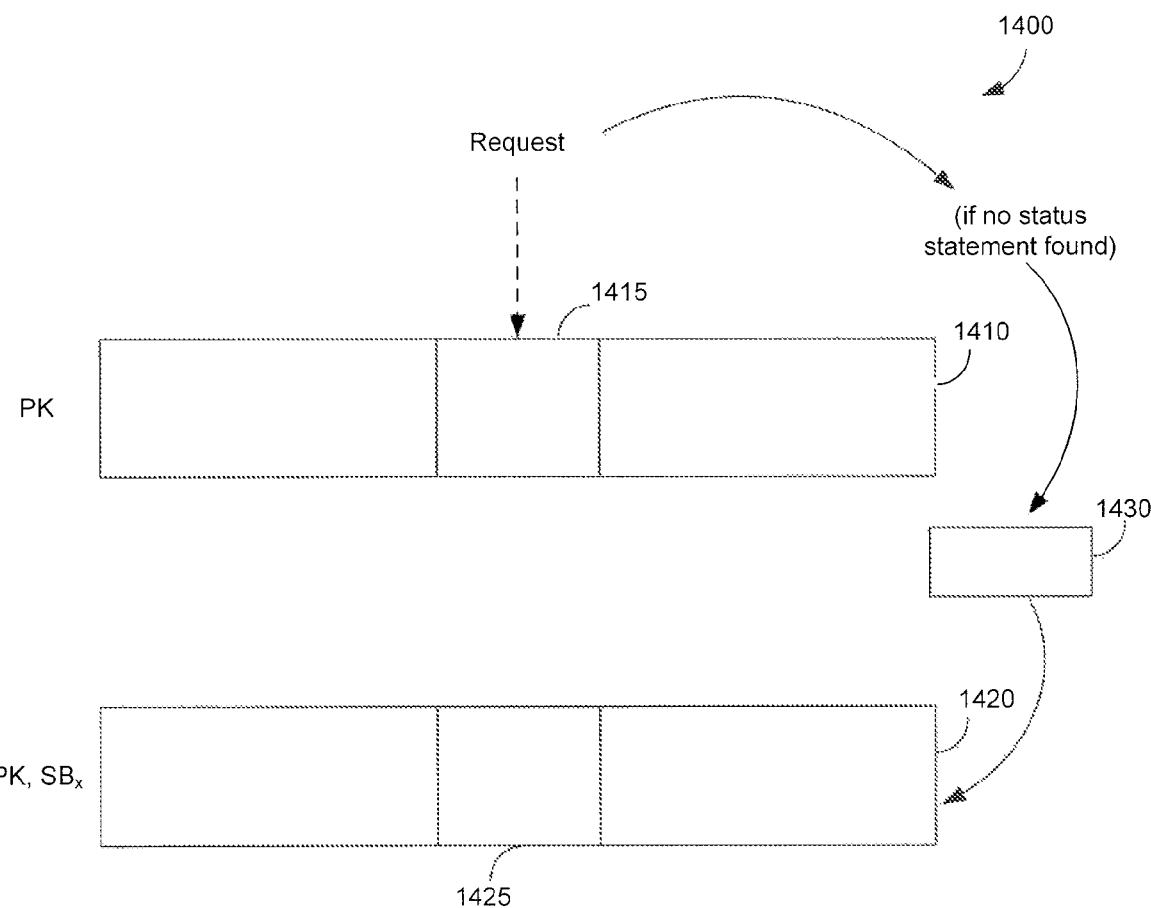
FIG. 14 illustrates the use of filtering, according to an embodiment of the invention.

Such an embodiment of the invention is illustrated in FIG. 14, which shows an entity 1410 in, an entity cache. The illustrated entity 1410 is identified by primary key PK. Also shown is an entity 1420 from the related sandbox cache (designated by PK and a sandbox cache ID, SBx). A request for a sandbox value in the entity 1410 (shown by the dotted line) results in accessing a filter 1430. In particular, the status statement for the desired value will be sought. If no status message is found, then the process looks to the sandbox entity cache for corresponding sandbox entity 1420. Filter 1430 is used to find this entity. If entity 1420 is found and contains, for example, an overwritten value for the stated value key, this value (1425) is returned.

Note that removal or insertion of the sandbox entity 1420 would require invalidation (and redefinition) of the filter 1430, because of the dependency between the two.

Filters may be more complex than what is described in the example above. For example, a request for a portfolio may mean accessing a filter that points to all holdings of the portfolio. If a user then adds an entity to the portfolio (i.e., a holding), for instance, then the original filter would have to be invalidated and replaced with a filter that includes a reference to the new holding. In this situation, in an embodiment of the invention, a stub may be placed in the sandbox cache in place of the new holding. Subsequent attempts to access the new holding would then be redirected to the underlying entity cache using the redefined filter.

Removal of an entity likewise requires invalidation of a filter. If a holding is removed from a portfolio, the filter associated with the portfolio is invalidated, then redefined so as not to refer to the removed holding. The REAL variable associated with the holding will be changed from true to false to imply the removal of the holding outside the sandbox cache. In an embodiment of the invention, however, the holding will actually remain in the entity cache for future reference.

In embodiments of the invention using the invalidation operation, the clearing process also incorporates invalidation. As entities are cleared from a sandbox cache, corresponding filters are also invalidated as a result of the dependencies between entities and their filters. Moreover, when a sandbox entity is cleared, the sandbox ID is also removed from the insertions and removals lists corresponding to the value.

IV. COMPUTING ENVIRONMENT

The processing of the invention can be implemented in a variety of embodiments. In particular, the processing can be performed using logic that takes the form of hardware, software, or firmware, or any combination thereof. Logic embodied as software may be stored in any memory medium known to persons of skill in the art, such as read only memory, optical disks, flash memory, etc. Such logic would take the form of instructions and data, whereby the instructions would be executed by one or more programmable processors in communication with the memory medium. The processor may be any commercially available device or may be a custom device.

V. CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for enabling users to model changes to entities in large scale sets of data in different respective sandbox caches comprising:
    loading sets of data in a database;
    organizing the loaded data in entity caches according to an entity model, each entity cache corresponding to one or more entities;
    creating an initial report of information drawn from the loaded data for manipulation by a user through a user-interface;
    storing information in the initial report in a respective sandbox cache having data organized according to the entity model; and
    enabling the user to manipulate the respective sandbox cache to change values in the data organized according to the entity model in the respective sandbox cache without necessarily changing values of corresponding data organized according to the entity model in other sandbox caches or in the database.

2. The method of claim 1, wherein the enabling user to manipulate enables a user to add or delete entities and change, calculate or recalculate values in the data organized according to the entity model in the respective sandbox cache without changing values of corresponding data organized according to the entity model in the underlying entity caches.

3. The method of claim 2, further comprising:
    retrieving a static value in response to a user manipulation, such that after said retrieval, the value is included in an entity in a respective sandbox cache.

4. The method of claim 3, further comprising:
    changing the static value in the entity, such that a corresponding value in the database is unchanged;
    invalidating values in an entity associated with the entity, wherein the invalidated values depend on the changed value; and
    recalculating any values in the user entity that depend on the changed value.

5. The method of claim 3, wherein the static value is uniquely identified by an entity type, an identifier for a respective sandbox cache, a primary key of a respective entity, and a value key, and said retrieving of a static value includes:
    looking up an entity in a respective sandbox cache identified by the identifier for the respective sandbox cache including finding the entity within the identified sandbox cache that corresponds to the primary key of the respective entity; and
    looking up a status statement that matches the value key.

6. The method of claim 2, further comprising retrieving a calculated value in response to a user manipulation, such that after said retrieval, the calculated value is included in an entity in a respective sandbox cache.

7. The method of claim 1, further comprising publishing the respective sandbox cache.

8. The method of claim 7, wherein the publishing comprises:
    constructing a message describing the changes in the respective sandbox cache;
    sending the message to a proxy of an entity cache corresponding to the respective sandbox cache;
    persisting any changes in the respective sandbox cache to the database; and
    broadcasting, by the proxy, of the message to the corresponding entity cache.

9. A computer program product article comprising a non-transitory computer useable medium having control logic stored therein for causing a computer to enable a user to model changes to entities in large scale sets of data in different respective sandbox caches, the computer control logic causing the computer to:
    load sets of data in a database;
    organize the loaded data in entity caches according to an entity model, each entity cache corresponding to one or more entities;
    create an initial report of information drawn from the loaded data for manipulation by a user through a user-interface;
    store information in the initial report in a respective sandbox cache having data organized according to the entity model; and enable the user to manipulate the respective sandbox cache to change values in the data organized according to the entity model in the respective sandbox cache without necessarily changing values of corresponding data organized according to the entity model in other sandbox caches or in the database.

10. The computer program product article of claim 9, wherein in response to the user manipulation the computer control logic causes the computer to add or delete entities and change, calculate or recalculate values in the data organized according to the entity model in the respective sandbox cache without changing values of corresponding data organized according to the entity model in the underlying entity caches.

11. The computer program product article of claim 10, wherein the computer control logic causes the computer to:
retrieve a static value in response to a user manipulation, such that after said retrieval, the value is included in an entity in a respective sandbox cache.

12. The computer program product article of claim 11, wherein the computer control logic causes the computer to:
change the static value in the entity, such that a corresponding value in the database is unchanged;
invalidate values in an entity associated with the entity, wherein the invalidated values depend on the changed value; and
recalculate any values in the user entity that depend on the changed value.

13. The computer program product article of claim 11, wherein the static value is uniquely identified by an entity type, an identifier for a respective sandbox cache, a primary key of a respective entity, and a value key, and the computer control logic causes the computer to:
look up an entity in a respective sandbox cache identified by the identifier for the respective sandbox cache including finding the entity within the identified sandbox cache that corresponds to the primary key of the respective entity; and
look up a status statement that matches the value key to retrieve the static value.

14. The computer program product article of claim 10, wherein the computer control logic further causes the computer to retrieve a calculated value in response to a user manipulation, such that after said retrieval, the calculated value is included in an entity in a respective sandbox cache.

15. The computer program product article of claim 9, wherein the computer control logic further causes the computer to publish the respective sandbox cache.

16. The computer program product article of claim 15, wherein to publish the respective sandbox cache the computer control logic causes the computer to:
construct a message describing the changes in the respective sandbox cache;
send the message to a proxy of an entity cache corresponding to the respective sandbox cache;
persist any changes in the respective sandbox cache to the database; and
broadcast, by the proxy, of the message to the corresponding entity cache.

17. A system for enabling users to model changes to entities in large scale sets of data in different respective sandbox caches, comprising:
at least one processor; and
a memory in communication with said at least processor, said memory for storing processing instructions for directing said at least processor to:
load sets of data in a database;
organize the loaded data in entity caches according to an entity model, each entity cache corresponding to one or more entities;
create an initial report of information drawn from the loaded data for manipulation by a user through a user-interface;
store information in the initial report in a respective sandbox cache having data organized according to the entity model; and
enable the user to manipulate the respective sandbox cache to change values in the data organized according to the entity model in the respective sandbox cache without necessarily changing values of corresponding data organized according to the entity model in other sandbox caches or in the database.

18. The system of claim 17, wherein the processing instructions further direct said at least processor to add or delete entities and change, calculate or recalculate values in the data organized according to the entity model in the respective sandbox cache without changing values of corresponding data organized according to the entity model in the underlying entity caches.

19. The system of claim 18, wherein the processing instructions further direct said at least processor to retrieve a static value in response to a user manipulation, such that after said retrieval, the value is included in an entity in a respective sandbox cache.

20. The system of claim 17, wherein the static value is uniquely identified by an entity type, an identifier for a respective sandbox cache, a primary key of a respective entity, and a value key, and the processing instructions to retrieve a static value further direct said at least processor to:
look up an entity in a respective sandbox cache identified by the identifier for the respective sandbox cache including finding the entity within the identified sandbox cache that corresponds to the primary key of the respective entity; and
look up a status statement that matches the value key.

21. The system of claim 17, wherein the large scale sets of data cover various portfolio holdings, and wherein the processing instructions further direct said at least processor to organize the loaded data in entity caches according to the entity model where each entity cache corresponds to one or more entities associated with respective portfolio holdings, and to enable the user to manipulate a portfolio holding in a respective sandbox cache to change values in the data organized according to the entity model in the respective sandbox cache without necessarily changing values of corresponding data organized according to the entity model in other sandbox caches or in underlying entity caches of the database.

\* \* \* \* \*